United States Patent
Oshiro et al.

(10) Patent No.: US 6,396,396 B2
(45) Date of Patent: May 28, 2002

(54) METHOD FOR ALARMING DECREASE IN TIRE AIR-PRESSURE AND APPARATUS USED THEREFOR

(75) Inventors: Yuji Oshiro; Minao Yanase, both of Kobe (JP)

(73) Assignees: Sumitomo Rubber Industries, Ltd., Hyogo-ken; Sumitomo Electric Industries, Ltd., Osaka-fu, both of (JP)

( * ) Notice: Subject to any disclaimer, the term of this patent is extended or adjusted under 35 U.S.C. 154(b) by 0 days.

(21) Appl. No.: 09/731,732

(22) Filed: Dec. 8, 2000

(30) Foreign Application Priority Data

Dec. 9, 1999 (JP) .............................. 11-350426
Sep. 20, 2000 (JP) ....................... 2000-285419

(51) Int. Cl.$^7$ .............................. B60C 23/02
(52) U.S. Cl. ..................... 340/442; 73/146.2
(58) Field of Search ................ 340/442, 441; 73/146.7, 146.2, 146.5; 116/34 R

(56) References Cited

U.S. PATENT DOCUMENTS

| | | | | |
|---|---|---|---|---|
| 4,876,528 A | * | 10/1989 | Walker et al. | 340/442 |
| 5,561,415 A | * | 10/1996 | Dieckmann | 340/444 |
| 5,614,882 A | * | 3/1997 | Latarnik et al. | 340/444 |
| 5,760,682 A | * | 6/1998 | Liu et al. | 340/444 |
| 5,886,624 A | * | 3/1999 | Hebert | 340/442 |
| 5,907,097 A | * | 5/1999 | Nakajima | 73/146.2 |
| 5,963,128 A | * | 10/1999 | McClelland | 340/447 |
| 6,060,983 A | * | 5/2000 | Yanase et al. | 340/442 |
| 6,137,400 A | * | 10/2000 | Yanase et al. | 340/442 |

* cited by examiner

Primary Examiner—John Tweel
(74) Attorney, Agent, or Firm—Birch, Stewart, Kolasch & Birch, LLP

(57) ABSTRACT

A method and apparatus for judging a decrease in internal pressure of a tire attached to a four-wheeled vehicle and for accordingly generating an alarm, wherein a threshold for judging decompression is set to be larger immediately after switching an ignition key ON when compared to a threshold for the vehicle in a normal running condition, and decompression is judged in a decompression judging time which is shorter than a time for the vehicle in a normal running condition. The threshold for judging decompression and the decompression judging time are returned to that for the normal running condition of the vehicle in the case no decompression is judged. It is thus possible to detect a condition in which a large decompressed condition exists at an early stage before running begins so that it is possible to improve the accuracy of detecting decompression.

4 Claims, 5 Drawing Sheets

METHOD FOR ALARMING DECREASE IN TIRE AIR-PRESSURE AND APPARATUS USED THEREFOR

BACKGROUND OF THE INVENTION

The present invention relates to a method for alarming a decrease in tire air-pressure and an apparatus used therefore. More particularly, it relates to a method for alarming a decrease in tire air-pressure and an apparatus used therefore wherein a threshold for judging a decompressed condition and a setting for a time required for judging the decompressed condition are varied prior and after start of driving to thereby improve the accuracy of detecting a decompressed condition.

While one possible factor causing decrease in internal pressure of a tire is minute leakage of air from between rubber molecules of the tire, it is mostly the case that decreases in internal pressure are caused through damages of tire units, rims or tire valves which are component members of tires. Speeds at which internal pressures are decreased caused by a nail piercing through a tire, which is the most occurring factor, have so far been reported upon performing various experiments.

JAF MATE, June 1995 edition includes a report of results about experiments performed for testing air-pressure decreasing speeds in case of blowouts of tires caused through nails. According to this article, a tire with a normal internal pressure of 2.1 kgf/cm$^2$ (2.06×10$^4$ Pa) was used, and the internal pressure decreased only to 1.95 kgf/cm$^2$ (1.91×10$^4$ Pa) (decrease of approximately 7%) upon elapse of as much as 5 hours in case the nail remained in the tire. Also in case the nail was removed, the internal pressure decreased to only 1.90 kgf/cm$^2$ (1.86×10$^4$ Pa) (decrease of approximately 10%) after elapse of 1 hour and to only 1.65 kgf/cm$^2$ (1.62×10$^4$ Pa) (decrease of approximately 21%) after elapse of 5 hours.

On the other hand, it was found that the air-pressure remained at 2.60 kgf/cm$^2$ (2.55×10$^4$ Pa) after driving for 2 hours under a condition where a nail having a diameter of 3.1 mm and a length of 65 mm was pierced through a tread block portion of a tire having a tire size of 215/70R15 and a normal internal pressure of 2.60 kgf/cm$^2$ (2.55×10$^4$ Pa). When measuring the internal pressure of the tire when the vehicle was halting at an interval of 15 seconds after removing this nail, the internal pressure decreased to 1.90 kgf/cm$^2$ (1.86×10$^4$ Pa)(decrease by approximately 27%) after elapse of 60 seconds and to 1.35 kgf/cm$^2$ (1.32×10$^4$ Pa) (decrease by approximately 48%) after elapse of 120 seconds. These results indicate remarkably faster internal pressure decreasing speeds than compared to the test of JAF.

While there is presently no clear definition as to a degree of decrease in internal pressure at which the vehicle becomes dangerous, it will at least not become impossible to drive owing to the damage of the tire although cornering performances will become inferior when the decrease in internal pressure is approximately 40%. Thus, by setting this degree of compression as a target value, it will be possible to inform the driver of danger caused through a decrease in internal pressure of a tire if it would be possible to detect a decrease in air-pressure within a time of 60 seconds although the air-pressure decreasing speed is fast as illustrated in FIG. 5.

However, since decreases in internal pressure of a tire will progress not only during driving but also during halting, decompression might gradually progress over night upon parking one's vehicle without knowing that a blowout has occurred during driving to find out on the next morning that the tire is largely decompressed when starting driving.

In the case of a vehicle which had not been moved for a long time, tires might be largely decompressed owing to natural decompression when starting driving of the vehicle.

On the other hand, according to conventional methods for estimating decompression of a tire based on revolution velocities of tires (see, for instance, Japanese Unexamined Patent Publication No. 305011/1988), a decrease in tire air-pressure cannot be detected unless the tires are rotating, that is, unless the vehicle is running so that it might take several tens of seconds for detecting decompression even if the degree of decompression is large.

The present invention has been made in view of these facts, and it is an object thereof to provide a method for alarming decrease in tire air-pressure and an apparatus used therefor with which it is possible to detect a largely decompressed condition before start of running to thereby improve the accuracy of detecting decompression. It should be noted that a "before-start-of-running" condition indicates a condition prior to throwing of a power source of the apparatus, which is generally a condition prior to turning an ignition switch ON.

SUMMARY OF THE INVENTION

In accordance with the present invention, there is provided a method for alarming decrease in tire air-pressure for judging a decrease in internal pressure of a tire attached to a four-wheeled vehicle and for accordingly generating alarm, wherein a threshold for judging decompression is set to be larger immediately after switching an ignition key ON when compared to a threshold for the vehicle in a normal running condition, decompression is judged in a decompression judging time which is shorter than a time for the vehicle in a normal running condition, and the threshold for judging decompression and the decompression judging time are returned to those for the normal running condition of the vehicle in case no decompression is judged.

In accordance with the present invention, there is also provided an apparatus for judging a decrease in internal pressure of a tire attached to a four-wheeled vehicle and for accordingly generating an alarm, comprising a velocity detecting means for detecting a velocity signal of respective tires, a judging means for performing calculating processes of a decompression judgement value for comparing a difference of two diagonal sums of rotational information of front wheel tires and rotational information of rear wheel tires based on rotational information obtained from the velocity signals detected by the velocity detecting means, an initial judging means for setting a threshold for judging decompression to be larger immediately after switching an ignition key ON when compared to a threshold for the vehicle in a normal running condition and judging decompression in a decompression judging time which is shorter than a time for the vehicle in a normal running condition, and a returning means for returning the threshold for judging decompression and the decompression judging time to those for the normal running condition of the vehicle in case no decompression is judged.

In accordance with the present invention, there is further provided a method for judging a decrease in internal pressure of a tire attached to a four-wheeled vehicle and for accordingly generating an alarm, comprising the steps of setting a threshold for judging decompression to be larger immediately after switching an ignition key ON when compared to a threshold for the vehicle in a normal running condition and judging decompression in a decompression judging time which is shorter than a time for the vehicle in a normal running condition; judging whether the vehicle is running on a bad road while a decompressed condition is judged during the short decompression judging time; and increasing a number of data used for judging decompression than compared to a number of data which might be incorporated during the short decompression judging time in case it is judged that the vehicle is running on a bad road.

In accordance with the present invention, there is yet further provided an apparatus for judging a decrease in internal pressure of a tire attached to a four-wheeled vehicle and for accordingly generating alarm, comprising a velocity detecting means for detecting a velocity signal of respective tires, a judging means for performing calculating processes of a decompression judging value for comparing a difference of two diagonal sums of rotational information of front wheel tires and rotational information of rear wheel tires based on rotational information obtained from the velocity signals detected by the velocity detecting means, an initial judging means for setting a threshold for judging decompression to be larger immediately after switching an ignition key ON when compared to a threshold for the vehicle in a normal running condition and judging decompression in a decompression judging time which is shorter than a time for the vehicle in a normal running condition, a bad road judging means for judging whether the vehicle is running on a bad road while a decompressed condition is judged during the short decompression judging time, and a data updating means for increasing a number of data used for judging decompression than compared to a number of data which might be incorporated during the short decompression judging time in case it is judged that the vehicle is running on a bad road.

DETAILED DESCRIPTION

A method for alarming decrease in tire air-pressure and an apparatus used therefor according to the present invention will now be explained based on the accompanying drawings.

Figure 1:
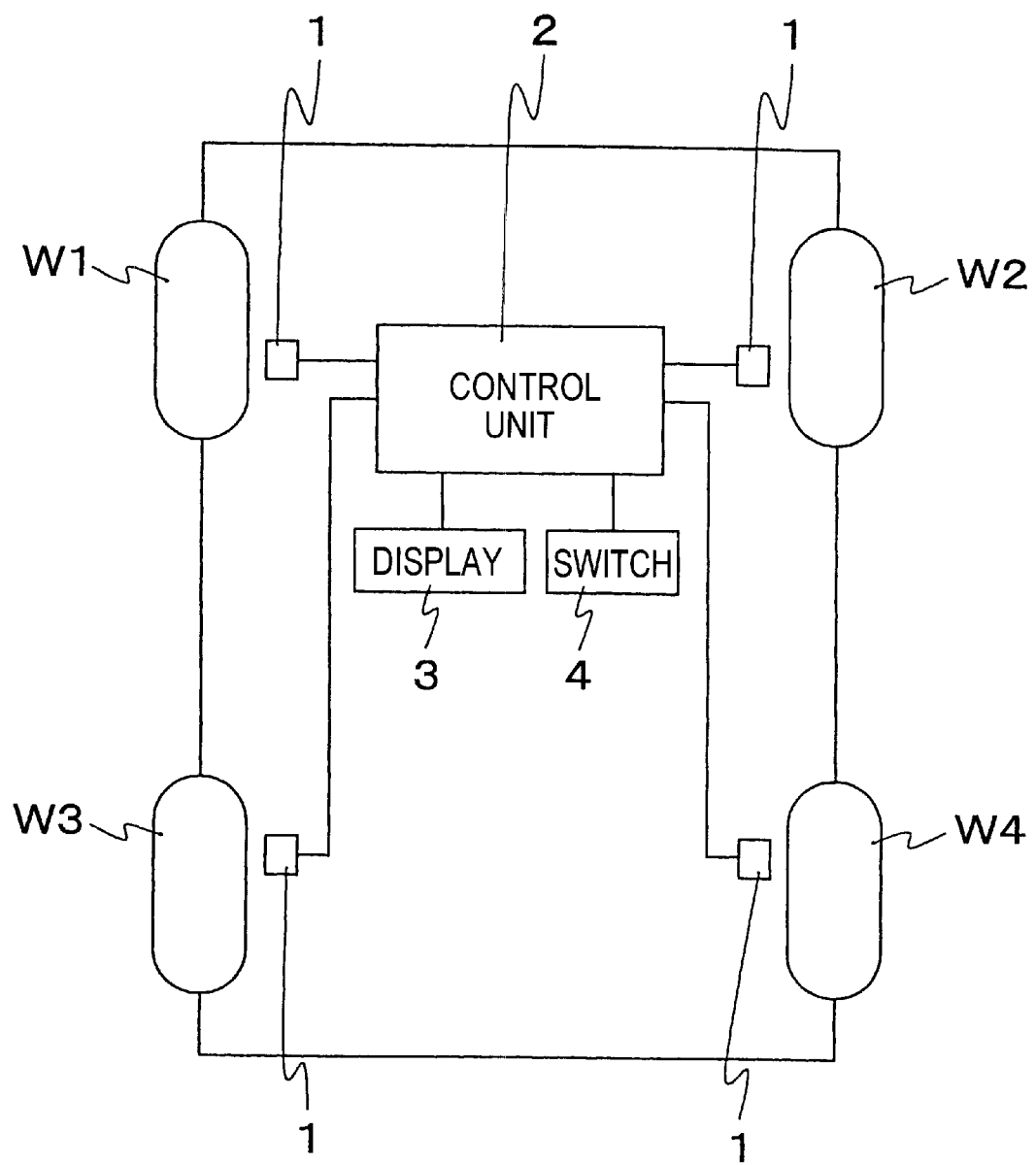
FIG. 1 is a block diagram illustrating an embodiment of an apparatus for alarming decrease in tire air-pressure according to the present invention.
Figure 2:
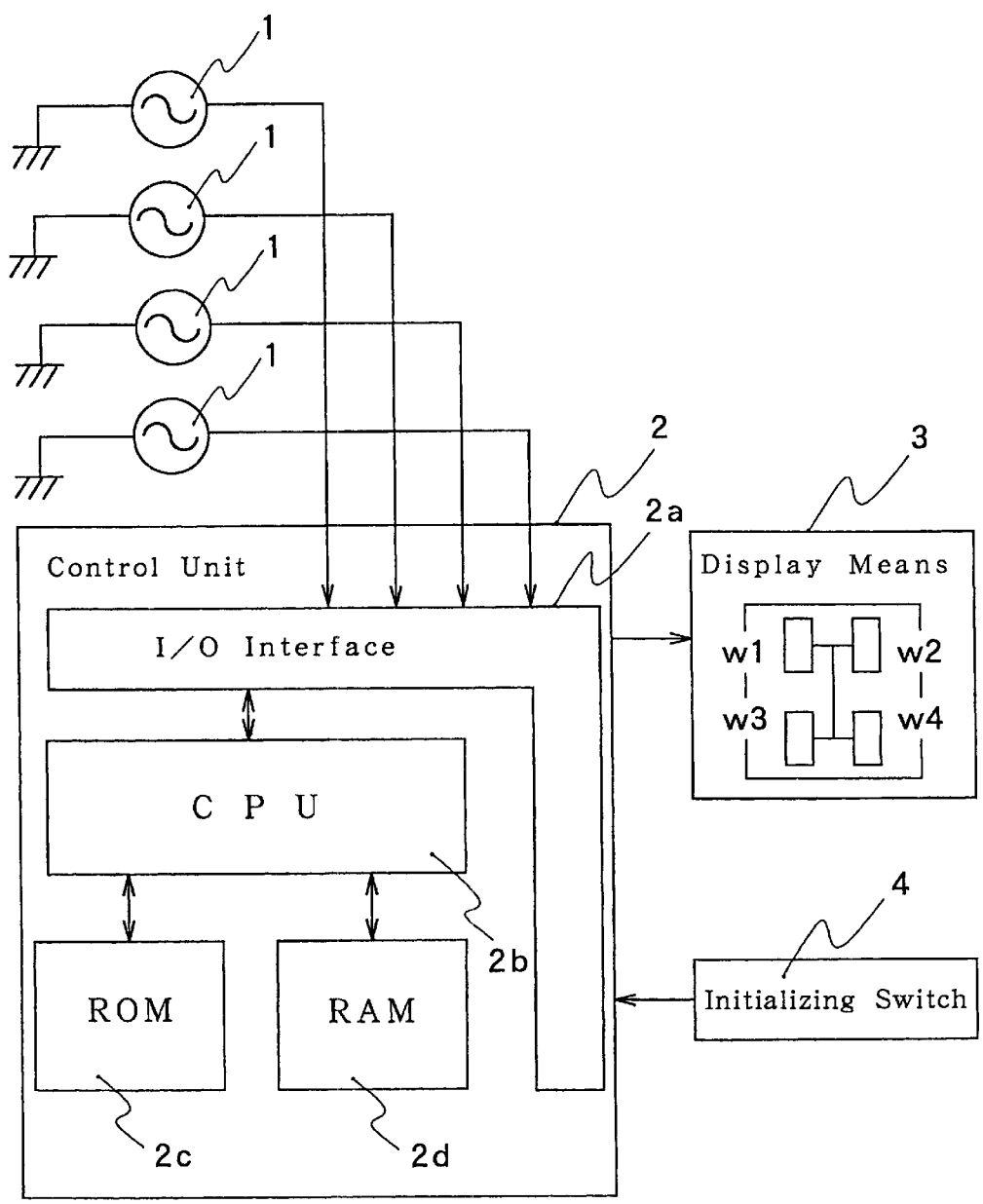
FIG. 2 is a block diagram illustrating electric arrangements of the apparatus for alarming decrease in tire air-pressure of FIG. 1.

As shown in FIG. 1, the apparatus for alarming decrease in air-pressure according to an embodiment of the present invention is for detecting whether an air-pressure of any of four wheels $W_1$, $W_2$, $W_3$ and $W_4$ attached to a four-wheeled vehicle has decreased or not, and comprises wheel velocity sensors 1, which are normal velocity detecting means, that are respectively arranged in connection with each of the tires $W_1$, $W_2$, $W_3$ and $W_4$. Outputs of the wheel velocity sensors 1 are supplied to a control unit 2. To the control unit 2, there are connected a display means 3 composed of liquid crystal display devices, plasma display devices, or CRT for informing a tire $W_i$ of which air-pressure has decreased, and an initializing switch 4 which might be operated by the driver.

The control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations. The judging means, initial judging means and the returning means in the present embodiment are included in the control unit 2.

Each vehicle velocity sensor 1 outputs a pulse signal corresponding to the number of revolution of the tire $W_i$ (hereinafter referred to as "wheel velocity pulse"). The CPU 2b calculates a rotational angular velocity $F_i$ for each tire $W_i$ at specified sampling period $\Delta T$ (sec), for instance, each $\Delta T=1$ second, based on the wheel velocity pulse output from the wheel velocity sensor 1.

Since tires $W_i$ are manufactured to include variations (initial differences) within specifications, it is not always the case that effective rolling radii of respective tires $W_i$ (values obtained by dividing a distance which has been traveled through a single rotation with $2\pi$) are identical even though all of the tires $W_i$ are at normal internal pressure. Thus, the rotational angular velocity $F_i$ for each tire $W_i$ will be varied. In order to cancel such variations owing to initial differences, a corrected rotational angular velocity $F1_i$ is calculated. More particularly, the following corrections are made:

$F1_1 = F_1$
$F1_2 = mF_2$
$F1_3 = F_3$
$F1_4 = nF_4$

The correction coefficients m, n are obtained by calculating a rotational angular velocity $F_i$ under a condition, for instance, that the vehicle is performing straight-ahead running and obtained as $m = F_1/F_2$ and $n = F_3/F_4$ based on the calculated rotational angular velocity $F_i$.

Based on the above $F1_1$, velocity V of the vehicle ($V_i/4$) or lateral directional acceleration (lateral G) is obtained.

A decompression judgement value (DEL) for detecting decrease in air-pressure of tire $W_i$ is for comparing a difference between two diagonal sums of, for instance, the front wheel tires and rear wheel tires, and is obtained from the following equation (1) which is a ratio of a value obtained by subtracting a sum of signals of one pair of diagonally located wheels from a sum of signals of the other pair of diagonally located wheels to an average value of the two sums:

$$DEL = \frac{2 \times \{(V1 + V4) - (V2 + V3)\}}{V1 + V2 + V3 + V4} \times 100(\%) \qquad (1)$$

In case a running test is performed using a vehicle to which one tire is attached with its internal pressure (air-pressure) being decreased by 30% from the normal internal pressure in a normal running condition for the vehicle, the calculated decompression judgement value is approximately 0.18%.

A calculated decompression judgement value with a lower limit being a partial decompression of the tire (8.3%) based on this test result is approximately 0.05% while a calculated decompression judgement value with an upper limit being a complete decompression of the tire (100%) is approximately 0.6%.

Thus, it was conventionally the case that decompression was indicated upon detecting decompression for 60 seconds and in case the decompression judgement value was larger than 0.05% and smaller than 0.6%.

However, the present embodiment is so arranged that a threshold for judging decompression is set to be larger immediately after an ignition key is turned ON than compared to a threshold for a normal running condition of the vehicle, e.g. to a value corresponding to 50% decompression and a length of time for data on rotational information which are used for judgement is set to be shorter than a time for a normal running condition of the vehicle, e.g. to 5 seconds so as to enable early detection of decompression also when the internal pressure (air-pressure) of the tire has largely decompressed from the normal internal pressure.

In case no decompression is judged during this process, the threshold for judging decompression is set to be a normal threshold, e.g. value corresponding to 30% decompression, and the length of time for data used for the judgement is set to be a normal length, e.g. 60 seconds.

The present invention will now be explained based on embodiments while the present invention is not limited to these embodiments alone.

Embodiment 1

A Mercedes Benz of A Class type (tire size: 195/50R15) was used as a vehicle for running, wherein tests were performed with an air-pressure for a right rear tire being set to 0.5 bar and air-pressures for the remaining left rear tire and right and left front tires being set to normal air-pressure of 2.2 bar (Test 1) and wherein the air-pressure for the right rear tire was changed to 1.0 bar (Test 2). A sampling time for revolution velocities of the wheels was set to be 1 second.

Figure 3:
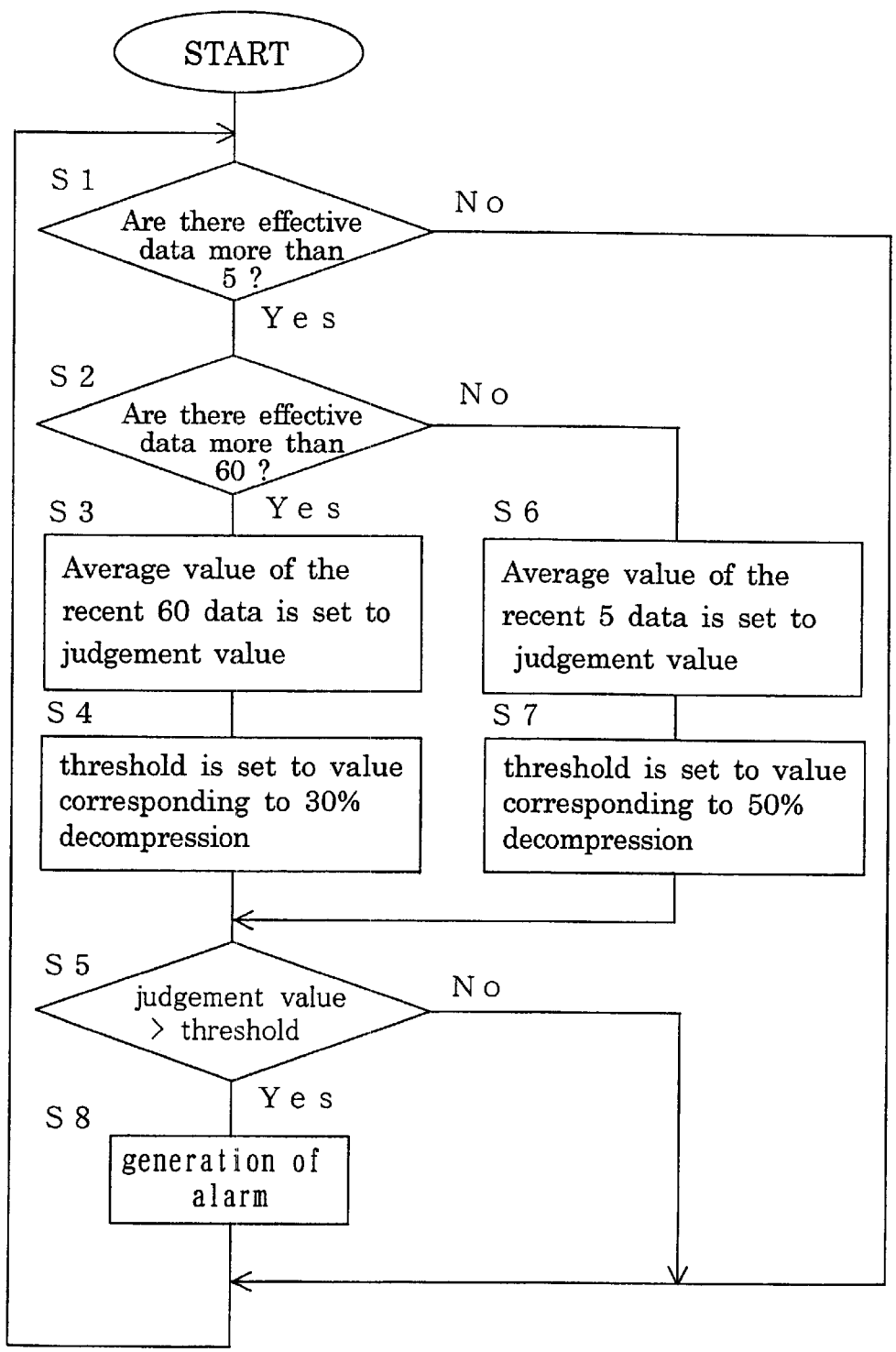
FIG. 3 is a flowchart related to one method of the present invention.

Based on data for 60 seconds (60 data) similarly to a conventional method for detection (Steps S1, S2 and S3), judgement was performed (Steps S5, S8) with the threshold for judging decompression being set to the normal threshold (value corresponding to 30% decompression) (Step S4) with respect to Test 1 and Test 2 as illustrated in FIG. 3. The time required for performing detection of decompression by using this method for detection was 74 seconds for Test 1 and 76 seconds for Test 2.

Thereafter, judgement was performed (Steps S5, S8) with the threshold for judging decompression being set to the normal threshold (value corresponding to 50% decompression) (Step S7) based on data for 5 seconds (5 data) (Step S6) in accordance with the method for detection of the present invention with respect to Test 1 and Test 2. The time required for performing detection of decompression by using the method for detection according to the present invention was 31 seconds for Test 1 and 28 seconds for Test 2.

It is obvious from these test results that the time required for performing detection of decompression could be remarkably reduced when employing the method for detection according to the present invention.

In the present embodiment, it is possible to detect decompression by using a decompression judging method which usually takes several tens of seconds to approximately 60 seconds in case judgement is made immediately after the ignition key is turned ON and no large decompression is present. However, a method in which judgement is performed in a short time by using the large threshold is apt to cause possibilities of variations in judged values owing to disturbance factors such as slip, acceleration/deceleration or cornering since the length of time for data used for the judgement is 5 seconds and thus short. Thus, by limiting such an opportunity of judgement to be performed only immediately after turning the ignition ON, it is possible to prevent an alarm (erroneous alarm) from being generated though the tire is in a normal internal pressure condition.

Another embodiment of the present invention will now be explained. In the above embodiment, the threshold for judging decompression is set to be larger immediately after the ignition key is turned ON than compared to a threshold of a normal running condition for the vehicle, for instance, to be a value corresponding to 50% decompression, and the length of time for data on rotational information which are used for judgement is set to be shorter than a time for a normal running condition of the vehicle, e.g. to 5 seconds so as to enable early detection of decompression also when the internal pressure (air-pressure) of the tire has largely decompressed from the normal internal pressure. In case the sampling time for the revolution velocities of the wheels is set to be 1 second, the number of data used for judging decompression will be 5.

In case no decompression is judged during this process, the threshold for judging decompression is set to be a normal threshold, e.g. value corresponding to 30% decompression, and the length of time for data used for the judgement is set to be a normal length, e.g. 60 seconds. The number of data used for judging decompression will at this time be 60.

In this manner, it is possible to perform judgement of decompression by fixing the number of effective data N which are employed for judging decompression immediately after the ignition key is turned ON to 5. However, since all data are incorporated without rejecting data obtained when running on a bad road, which might cause an erroneous alarm of decompression, it might happen that a decompressed condition is erroneously judged, even though the tire is in a normal internal pressure condition with data as few as 5.

Thus, the present embodiment is so arranged that a value increased by 1 to the initial value, for instance, 5 data, is set to be N each time it is judged that the vehicle is running on a bad road. With this arrangement, the number of effective data is increased for judging decompression depending on degrees of running on a bad road. The judging means, initializing judging means, bad road judging means and data updating means of the present embodiment are incorporated in the control unit 2.

A "bad road" indicates a split $\mu$ road, a gravel road or the like. It should be noted that a split $\mu$ road is a road surface with different friction coefficients $\mu$ for road surfaces of right and left tires, wherein, for instance, a right-hand side is an asphalt road surface while a left-hand side is a grass road surface. A method for judging that the vehicle is running on a bad road might be a method for judging a bad road in case an amount of change in differences in respective slip rates of the vehicle on the right and left that can be obtained from the wheel speeds. A degree for running on a bad road indicates a number of judging a bad road condition upon performing judgement of a bad road condition every second.

It should be noted that in increasing the amount of effective data for judging decompression, in case the number increases excessively, it will become impossible to judge decompression immediately after the ignition is turned ON so that measures are taken, for example, to set an upper limit to 10.

Embodiment 2 and Comparative Example 1

A Volkswagen Golf of 1,600 cc (tire size: 175/80R14 88H) was employed as a vehicle for running on a road partially including bad roads with tires of normal air-pressure. At this time, the bad road was a split $\mu$ road (road surfaces of asphalt and grass) and the sampling time for the revolution velocity of the wheels was set to 1 second.

Figure 4:
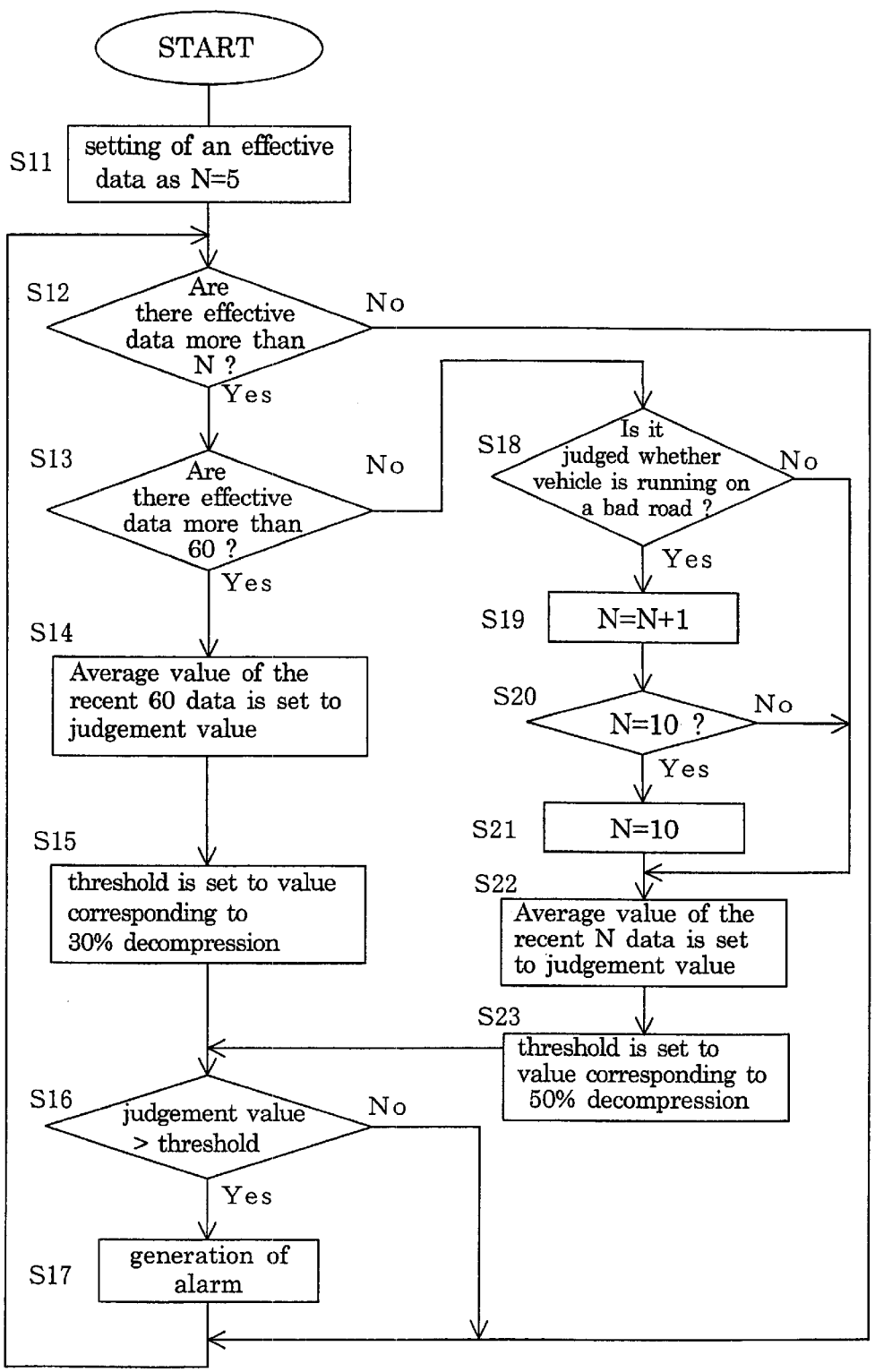
FIG. 4 is a flowchart related to another method of the present invention.
Figure 5:
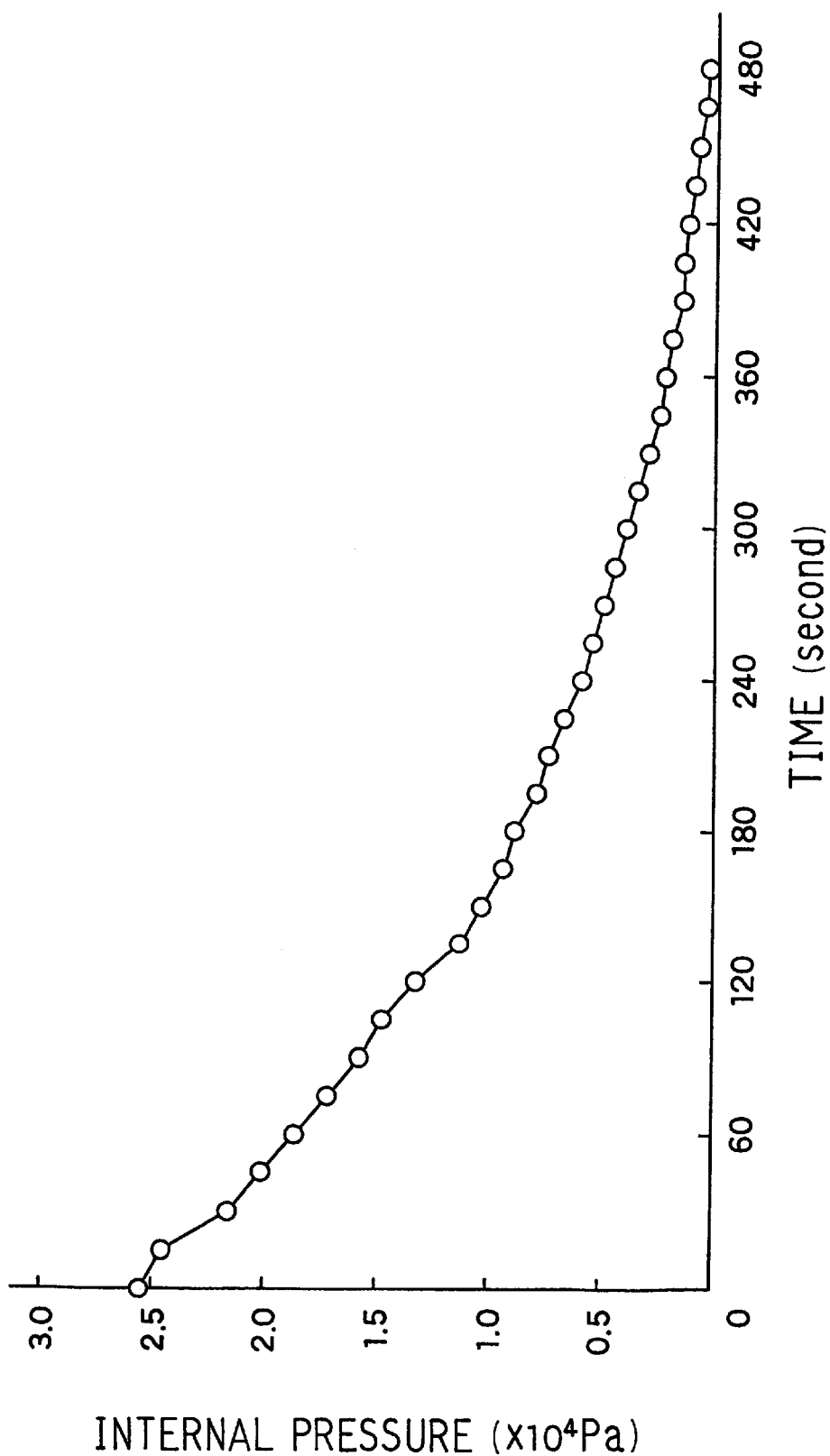
FIG. 5 is a view illustrating one example of decrease in air-pressure of a tire.

Judgement of decompression was conducted by employing a normal method for judgement in which judgement is performed based on data of 60 seconds (60 data) as illustrated in FIG. 4 (Steps S11 to S17) and a method for judgement for judging a condition where the vehicle is running on a bad road (Steps S11 to S13, S18 to S23 and S16 to S17) (Comparative Example 1 and Embodiment 2).

More particularly, the number of effective data N was set to 5 (Step S11) whereupon judgement was performed (Steps S16, S17) based on data of 60 seconds (60 data) (Step S12, S13, S14) with the threshold for judging decompression being set to be the normal threshold (value corresponding to 30% decompression) (Step S15).

Thereafter, in another method for judgement of the present invention, in case it is detected that the vehicle is running on a bad road (Step S18) while a decompressed condition is being judged based on data of 5 seconds (5 data) (Steps S11 to S13), a value for the number of data used for judging decompression increased from N by 1 (N+1) is set to be N (Step S19) and it is then judged whether this number N has reached 10 or not (Step S20). If it is judged that the number of effective data has reached 10, an average of these data N=10 is set to be a judgement value (Steps S21, S22) and the threshold is set to be a value corresponding to 50% decompression (Step S23). Thereafter, decompression was judged using the judgement value and the value corresponding to 50% decompression (Steps S16, S17).

In Comparative Example 1, judgement of decompression of a tire could not be detected early and erroneous alarms were generated owing to a condition running on a bad road. In Embodiment 2, it was possible to judge decompression of a tire early, and since data which have been erroneously incorporated when running on a bad road were averaged by a number of 10, which is more than 5, no erroneous alarms were generated.

According to the present embodiment, in case it is judged that no large decompression has occurred immediately after turning the ignition key ON, it is possible to detect decompression through normal judgement of decompression requiring several tens of seconds to approximately 60 seconds. However, the method in which judgement is performed in a short time using the large threshold is apt to cause possibilities of variations in judgement values owing to disturbance factors such as slip, acceleration/deceleration or cornering since the length of time for data used for the judgement is 5 seconds and thus short. Thus, by limiting such an opportunity of judgement to be performed only immediately after turning the ignition ON, it is possible to prevent an alarm (erroneous alarm) from being generated though the tire is in a normal internal pressure condition.

As explained so far, the present invention is capable of detecting a condition in which a large decompressed condition exists at an early stage before starting running so that it is possible to improve the accuracy of detecting decompression.

It is further possible to judge decompression of a tire early and to further prevent erroneous judgement during a condition in which the vehicle is running on a bad road.

What is claimed is:

1. A method for judging a decrease in internal pressure o a tire attached to a four-wheeled vehicle and for generating an alarm, wherein a threshold for judging decompression is set to be larger immediately after switching an ignition key ON, when compared to a threshold for the vehicle in a normal running condition, judging decompression in a decompression judging time which is shorter than a time for the vehicle in a normal running condition, and the threshold for judging decompression and the decompression judging time are returned to that for the normal running condition of the vehicle in the case no decompression is judged.

2. An apparatus for judging a decrease in internal pressure of a tire attached to a four-wheeled vehicle and for accordingly generating an alarm, comprising a velocity detecting means for detecting a velocity signal of respective tires, a judging means for performing calculating processes of a decompression judgment value for comparing a difference of two diagonal sums of rotational information of front wheel tires and rotational information of rear wheel tires based on rotational information obtained from the velocity signals detected by the velocity detecting means, an initial judging means for setting a threshold for judging decompression to be larger immediately after switching an ignition key ON when compared to a threshold for the vehicle in a normal running condition and judging decompression in a decompression judging time which is shorter than a time for the vehicle in a normal running condition, and a returning means for returning the threshold for judging decompression and the decompression judging time to that for the normal running condition of the vehicle in the case no decompression is judged.

3. A method for judging a decrease in internal pressure o a tire attached to a four-wheeled vehicle and for generating an alarm, comprising the steps of setting a threshold of judging decompression to be larger immediately after switching an ignition key ON when compared to a threshold of the vehicle in a normal running condition and judging decompression in a decompression judging time which is shorter than a time for the vehicle in a normal running condition; judging whether the vehicle is running on a bad road while a decompressed condition is judged during the short decompression judging time; and increasing the number of data used for judging decompression than compared to the number of data which might be incorporated during the short decompression judging time, in the case it is judged that the vehicle is running on a bad road.

4. An apparatus for judging a decrease in internal pressure of a tire attached to a four-wheeled vehicle and for accordingly generating an alarm, comprising a velocity detecting means for detecting a velocity signal of respective tires, a judging means for performing calculating processes of a decompression judgment value for comparing a difference of two diagonal sums of rotational information of front wheel tires and rotational information of rear wheel tires based on rotational information obtained from the velocity signals detected by the velocity detecting means, an initial judging means for setting a threshold for judging decompression to be larger immediately after switching an ignition key ON when compared to a threshold for the vehicle in a normal running condition and judging decompression in a decompression judging time which is shorter than a time for the vehicle in a normal running condition, a bad road judging means for judging whether the vehicle is running on a bad road while a decompressed condition is judged during the short decompression judging time, and a data updating means for increasing the number of data used for judging decompression than compared to a number of data which might be incorporated during the short decompression judging time in the case it is judged that the vehicle is running on a bad road.

* * * * *